United States Patent [19]
Fasulkey

[11] 3,912,982
[45] Oct. 14, 1975

[54] TRANSISTOR PROTECTIVE CIRCUIT WITH IMMINENT FAILURE SENSING

[75] Inventor: Robert H. Fasulkey, Fairfax, Va.
[73] Assignee: Westinghouse Electric Corporation, Pittsburgh, Pa.
[22] Filed: Sept. 25, 1974
[21] Appl. No.: 509,164

[52] U.S. Cl. .......................... 317/33 R; 317/33 R X
[51] Int. Cl.² ....................... H02H 3/00; H02H 7/00
[58] Field of Search ................ 317/33 R; 307/202 R

[56] References Cited
UNITED STATES PATENTS

| | | | |
|---|---|---|---|
| 3,504,285 | 3/1970 | Lemen | 317/33 R X |
| 3,522,480 | 8/1970 | Routh et al. | 317/33 R X |
| 3,536,958 | 10/1970 | Sondermeyer | 317/33 R |
| 3,558,987 | 1/1971 | Lewis | 317/33 R |
| 3,566,200 | 2/1971 | Seidler | 317/33 R |
| 3,622,849 | 11/1971 | Kelly et al. | 307/202 X |
| 3,792,316 | 2/1974 | Bondini et al. | 317/33 R X |
| 3,845,405 | 10/1974 | Leidich | 317/33 R X |

*Primary Examiner*—L. T. Hix
*Attorney, Agent, or Firm*—J. B. Hinson

[57] ABSTRACT

One or more selected transistors of a plurality of like transistors of a set, operated in parallel, are insulated thermally from a heat sink while the remainder of the transistors are in direct thermal contact with the heat sink. The output signal from the thermally insulated transistor(s) is compared against the output of the remaining transistors and a difference signal is produced. Any departure from normal operation is sensed whereupon the difference signal activates control circuitry for initiating protective action prior to multiple transistor failure. The thermally insulated transistor(s) is thus made to be in greater jeopardy than the remainder, thereby providing a reliable warning means of imminent failure.

12 Claims, 2 Drawing Figures

TRANSISTOR PROTECTIVE CIRCUIT WITH IMMINENT FAILURE SENSING

BACKGROUND OF THE INVENTION

1. Field of the Invention

This invention relates to transistor protective circuitry and more particularly to means for initiating operation of control circuitry which is adapted to protect a plurality of power transistors operated in parallel.

2. Description of the Prior Art

The problem of protecting transistors from electrical failure, particularly high voltage breakdown in power switching transistors, is extremely difficult because of the number of contributing causes and the complex relationships involved. For example, current and voltage waveforms, duty cycle, switching speed, peak dissipation, average dissipation, junction temperature, casing temperature and hot spot junction temperature are all factors having wide ranges each of which depends upon the combination of still other factors. Previous practice has sensed average current, voltage, case temperature or a combination of all three. The disadvantage of previous attempts in suitably protecting transistors from electrical failure is that unless extremely complex circuitry is utilized, exact prediction of failure cannot be made. Because of this, unnecessary cautious limitations are imposed to lessen the chance that an unforeseen set of hazardous conditions may occur.

In the usual case for operating a plurality of power transistors, they are operated in sets under nearly identical conditions, i.e., being connected in parallel with each set mounted on a respective common heat sink. It has been observed that if one transistor member of a parallel group or set reaches the verge of failure, this fact becomes evident as a drastic reduction in the ability of the specific transistor to turn on and thereafter turn off at the completion of a conduction period. This inability to turn on and turn off is thought to be related to a hot spot in the junction and is not simply dependent upon any one operating condition other than junction temperature. The casing temperature, moreover, is almost a useless indication of imminent failure because normal dissipation in the heat sink masks the hot spot contribution.

Typical protective circuits for transistors are shown and described in the following patents; U.S. Pat. No. 3,558,987, issued to Edward E. Lewis on Jan. 26, 1971; U.S. Pat. No. 3,566,200, issued to Robert L. Seidler on Feb. 23, 1971; and U.S. Pat. No. 3,480,852, issued to Han-Min Hung on Nov. 25, 1969.

SUMMARY OF THE INVENTION

Briefly the subject invention is directed to a plurality of parallely operated power switching transistors whose collector electrode is common to its metal casing. At least one of the transistors is mounted on, but at least partially thermally insulated from, a common heat sink. The remainder of the plurality of transistors are mounted on and in direct thermal contact with the heat sink. The output signal from the thermally insulated transistor is applied to one side of the primary winding of a transformer while the output signals of the remaining transistors are applied in parallel to the other side of the primary winding in order to provide a difference signal due to the bucking action effected in the transformer primary winding. The secondary winding of the transformer is coupled to rectifier means and a charging capacitor which in turn is connected to the control electrode of a semiconductor switch device which when rendered conductive is adapted to operate suitable circuitry which provides protective action for the plurality of transistors. The thermally insulated transistor is thus made to operate in a condition of leading jeopardy so as to tend to fail prior to the remaining transistors, which when failure begins to occur, is sensed by the transformer connection to iniaiate appropriate protective action.

DESCRIPTION OF THE PREFERRED EMBODIMENT

Figure 1:
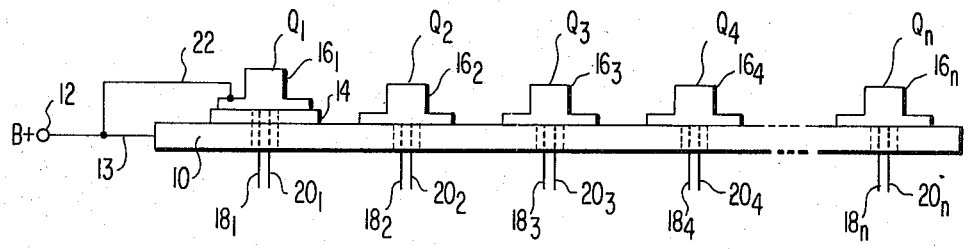
FIG. 1 is a profile view illustrative of a plurality of transistors mounted on a common heat sink in accordance with the subject invention.

Referring now to the drawings and more particularly to FIG. 1, there is disclosed a plurality of like power transistors $Q_1, Q_2 \ldots Q_n$ mounted on a common heat sink 10 which is also connected to a B+ supply potential applied to terminal 12 by a circuit lead 13. The heat sink thus also acts as a power supply buss. The transistors $Q_1, Q_2 \ldots Q_n$ comprise identical power switching transistors, a typical example of which is identified as a SVT 350-5 transistor manufactured by TRW. In such a transistor, the collector electrode is connected to the outer shell or metal casing of the device for purposes of heat dissipation. The emitter and base connections are made by suitable leads fed out of the metal casing as shown in FIG. 1.

One or more but at least one of the transistors for example transistor $Q_1$ is mounted on the heat sink 10 but is thermally insulated (at least partially) therefrom by means of a thermal insulator 14 shown comprising a spacer pad placed between the upper surface of the heat sink 10 and the casing $16_1$. Suitable attachment means, not shown, are included for mounting the transistor $Q_1$ on the thermal insulator 14 and accordingly to the heat sink 10. The insulator 14 and the heat sink 10 additionally includes an opening or hole through which the respective base and emitter leads $18_1$ and $20_1$ can pass therethrough for the desired circuit interconnection shown in FIG. 2. The thermal insulator 14 is also noted for purposes of illustration as being an electrical insulator as well. Accordingly, the casing $16_1$ of the transistor $Q_1$ additionally includes a separate circuit lead 22 connected to the B+ supply terminal 12 in order to afford greater thermal insulation. Where, however, only partial thermal insulation is desired, the casing $16_1$ could be in partial thermal contact with the heat sink 10 as provided by suitable mounting bolts or studs passing through the insulator member 14 to the heat sink. In such as case, the separate B+ lead 22 is not required. Thus the configuration shown in not meant to be interpreted in a limiting sense. As for the remainder of the transistors $Q_2, Q_3, Q_4 \ldots Q_{10}$, the respective metal casings $16_2, 16_3, 16_4 \ldots 16_n$ are all mounted in direct thermal contact with the heat sink 10 with the respective base and emitter leads $18_2$, etc. being fed out through respective openings in the heat sink 10.

Figure 2:
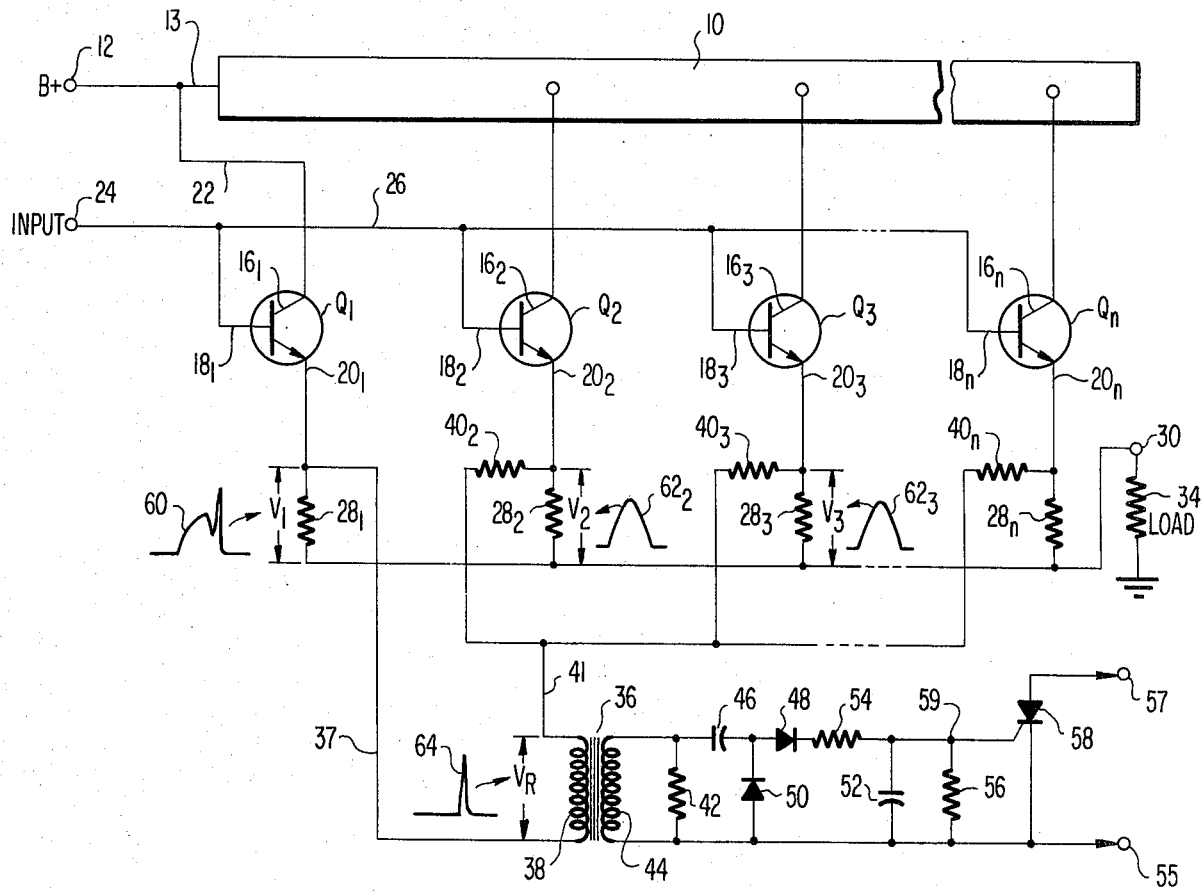
FIG. 2 is a schematic diagram illustrative of the preferred embodiment of the subject invention.

Referring now to FIG. 2, there is disclosed a schematic representation of the preferred embodiment of the subject invention. A separate connection of the casing 16, i.e., the collector of transistor $Q_1$ is made to the B+ supply potential while the remainder of the collectors $16_2$, $16_3$ ... $16_n$ are connected to the B+ supply potential directly by means of the heat sink 10. The base electrode leads $18_1$, $18_2$ ... $18_n$ are commonly connected to an input signal terminal 24 by means of a common signal buss 26. Each of the transistors $Q_1$, $Q_2$ ... $Q_n$ have a respective series emitter resistor $28_1$, $28_2$, $28_3$ ... $28_n$ which are commonly connected to an output terminal 30 by means of a circuit buss 32. An external lead circuit 34 is adapted to be coupled between the output terminal 30 and a point of reference potential shown as ground.

A pulse type transformer 36 has one end of its primary winding 38 connected via circuit lead 39 to a point between the emitter of transistor $Q_1$ and the emitter resistor $28_1$ and thus across the emitter resistor $28_1$. The other side of the primary winding is commonly connected across the emitter resistors $28_2$, $28_3$ ... $28_n$ of the remaining transistors $Q_1$ ... $Q_n$ by means of the respective summing resistors $40_2$, $40_3$ ... $40_n$ and circuit lead 41. A resistor 42 is coupled across the secondary winding 44 and a coupling capacitor 46 couples one end of winding 44 to a half-wave rectifier circuit comprising the diode 48. A clipping diode 50 is also connected across the secondary winding 44 intermediate the capacitor 46 and the diode 48. The diode 48 is poled such that only positive signals are coupled to a capacitor 52 by means of the resistor 54. Any negative going signals are clipped or shunted to the return side of the secondary winding 44 by diode 50. A resistor 56 having a predetermined resistance value is coupled in parallel with the capacitor 52 to provide a discharge circuit therefor of a predetermined RC time constant. The gate electrode of a semiconductor switch device 58 which for example may be a thyristor or an SCR is coupled to circuit junction 59 which is common to one side of capacitor 52. The other side of the capacitor is connected to the cathode electrode of the switch device 58. The switch device 58 is adapted to activate a control circuit, not shown, coupled across terminals 57 and 55 for protecting the transistors $Q_1$, $Q_2$, $Q_3$ ... $Q_n$. The protective circuit may be, for example, suitable circuit means for removing the B+ supply potential coupled to the terminal 12.

In operation, the thermally insulated transistor $Q_1$ while being subject to the same electrical operation as the other transistors $Q_2$, $Q_3$ ... $Q_n$ is caused to be placed in a position of greater jeopardy of failure than the remainder due to its inability to dissipate heat as well as the others. It has been observed that prior to such failure a spike develops in the current waveform on the leading and/or trailing edge which can be sensed for example by the voltage appearing across emitter resistor $28_1$. This is due to the inability of the transistor to properly turn on and off, respectively, at either the beginning or the end of a conduction period. Such a current waveform for example is shown by waveform 60 being the voltage $V_1$ developed across emitter resistor $28_1$. Assuming that the remaining transistors $Q_2$, $Q_3$ ... $Q_n$ are operating normally, their respective current waveforms as sensed across emitter resistors $28_2$, $28_3$ ... $28_n$, and designated $V_2$, $V_3$, etc., is typically shown by waveform 62. These signals are properly summed together and compared with waveform 60 by the bucking action taking place in the primary winding 38. A resultant current waveform $V_R$ comprised of $V_1 - (V_2 + V_3 + ... V_n)$ is a differential waveform 64 comprising the spike as shown by waveform 64. Waveform 64 appears across the secondary winding 44 where it is coupled by means of capacitor 46 through the diode rectifier 48 which is poled to conduct with a positive going waveform where it then charges the capacitor 52 according to the RC time constant provided by resistor 54 and capacitor 52. If the amplitude of the spike (waveform 64) is of a sufficient value, indicative of imminent transistor failure, the voltage across capacitor 52 will be sufficient to trigger the semiconductor switch device 58 and cause control action to be initiated.

It is to be noted that the comparison is made by the differences in the current waveform and not simply the average current. This is due to the fact that impending failure of a switching transistor is accompanied by the spike such as shown in waveform 60 which may not necessarily result in a significant change in the average current. Therefore, by waveform comparison, a warning of failure before multiple transistor failure is provided by the deliberate insulation of one or more transistors which places these devices in greater jeopardy than the remainder. Accordingly, appropriate action to protect the remainder of the transistors can be taken in a very simple and efficient manner.

Having thus described what is at present considered to be the preferred embodiment of the subject invention,

I claim:

1. A transistor protective circuit having means for sensing imminent transistor failure comprising in combination:

a plurality of transistors operated as a composite set of transistors;

a heat sink adapted for mounting said plurality of transistors thereon;

at least one transistor of said plurality thermally insulated, at least partially, from said heat sink, the remainder of said transistors being mounted directly on said heat sink;

first circuit means for sensing the output current waveform of said at least one transistor;

second circuit means for sensing the output current waveform of a selected number of the remainder of said transistors;

third circuit means coupled to said first and second circuit means for comparing the respective current output waveforms of said selected number of transistors with the output current waveform of said at least one transistor and providing a difference current waveform therefrom;

fourth circuit means coupled to said third circuit means, being responsive to said difference current waveform to produce an actuating signal in response to a predetermined amplitude of said difference current waveform indicative of imminent failure of said at least one transistor; and fifth circuit means responsive to said actuating signal and being rendered operative thereby to initiate predetermined protective action for said plurality of transistors.

2. The circuit as defined by claim 1 wherein said plurality of transistors comprise power switching transistors operated in parallel circuit relationship.

3. The circuit as defined by claim 2 wherein said plurality of power switching transistors are operated as emitter follower circuits.

4. The circuit as defined by claim 2 wherein said power switching transistors are of a like type, having a metal casing in direct contact with the collector of said transistors, and additionally including means for applying the collector supply potential to said heat sink.

5. A circuit as defined by claim 1 wherein said at least one transistor is mounted on said heat sink and having thermal insulation means spaced therebetween.

6. The circuit as defined by claim 1 wherein said first circuit means comprises a resistor connected in the emitter circuit of said at least one transistor for providing said output current waveform thereacross, and
wherein said second circuit means comprises a respective resistor connected in the emitter circuit of said selected number of transistors for providing respective output current waveforms thereacross.

7. The circuit as defined by claim 6 wherein said second circuit means additionally includes means for combining the output current waveforms appearing across said respective resistors.

8. The circuit as defined by claim 7 wherein said third circuit means comprises a transformer having a primary and a secondary winding, and
wherein one end of said primary winding is coupled to the emitter circuit of said at least one transistor and being responsive to the current waveform appearing across said resistor, and the other end is coupled to said combining means and being responsive to the combined output current waveforms to provide said difference current waveform.

9. The circuit as defined by claim 8 wherein said fourth circuit means includes rectifier means coupled to said secondary winding and a charging capacitor producing said actuating signal coupled to said rectifier means.

10. The circuit as defined by claim 9 wherein said rectifier circuit comprises half-wave rectifier means adapted to pass a current waveform of a single predetermined polarity and additionally including a resistor coupled between said rectifier and said capacitor for providing an RC charging circuit of predetermined time constant and a resistor coupled in parallel with said capacitor for providing a discharge circuit of predetermined RC discharge time constant.

11. The circuit as defined by claim 10 wherein said fifth circuit means comprises a semiconductor switch device having a control electrode coupled to said capacitor.

12. The circuit as defined by claim 10 wherein said fifth circuit means comprises a semiconductor switch device having gate, cathode, and anode electrodes and wherein said cathode and gate electrodes are coupled across said capacitor.

* * * * *